United States Patent [19]

Zivkovic

[11] Patent Number: 5,024,056
[45] Date of Patent: Jun. 18, 1991

[54] DUAL-CIRCUIT BRAKE BOOSTER

[75] Inventor: Milorad Zivkovic, Filderstadt, Fed. Rep. of Germany

[73] Assignee: Daimler-Benz, Fed. Rep. of Germany

[21] Appl. No.: 286,079

[22] Filed: Dec. 19, 1988

[30] Foreign Application Priority Data

Dec. 19, 1987 [DE] Fed. Rep. of Germany ....... 3743190

[51] Int. Cl.$^5$ .............................................. B60T 13/12
[52] U.S. Cl. ......................................... 60/550; 60/581
[58] Field of Search ....................... 60/547.1, 550, 551, 60/567, 581

[56]  References Cited

U.S. PATENT DOCUMENTS

| 4,015,881 | 4/1977 | Adachi | 60/581 X |
| 4,199,948 | 4/1980 | Mathues et al. | 60/581 X |
| 4,624,108 | 11/1986 | Leiber | 60/581 X |
| 4,631,924 | 12/1986 | Lowe | 60/581 X |
| 4,736,588 | 4/1988 | Leiber | 60/550 |
| 4,778,924 | 10/1988 | Leiber | 60/581 X |

FOREIGN PATENT DOCUMENTS 3444828 12/1986 Fed. Rep. of Germany .

Primary Examiner—Edward K. Look
Assistant Examiner—George Kapsalas
Attorney, Agent, or Firm—Evenson, Wands, Edwards, Lenahan & McKeown

[57] ABSTRACT

In a brake apparatus for a hydraulic two-circuit brake installation of a road vehicle with static brake circuits, an outlet pressure space is provided for one of these brake circuits in which the brake pressure that is coupled into a static brake circuit of the vehicle, is adapted to be built up by the displacement in the same direction of a master cylinder piston which is also displaceable by the pedal force alone, and of a servo piston which is displaceable only when the brake force servo unit is intact. The servo piston displaceable only with an intact brake force servo unit includes an annular piston which by pressure actuation of its actuating surface with the outlet pressure of a brake valve of the brake force servo unit, is urged into unilateral abutment with an entrainment flange of a plunger piston extending through the annular piston in the axial direction, which plunger piston, in its turn, is coupled for movement with a force-transmitting element, by way of which also the component of the actuating force resulting from the pedal actuation and acting on the master cylinder piston in the sense of a brake pressure build up displacement is introduced into the same.

12 Claims, 1 Drawing Sheet

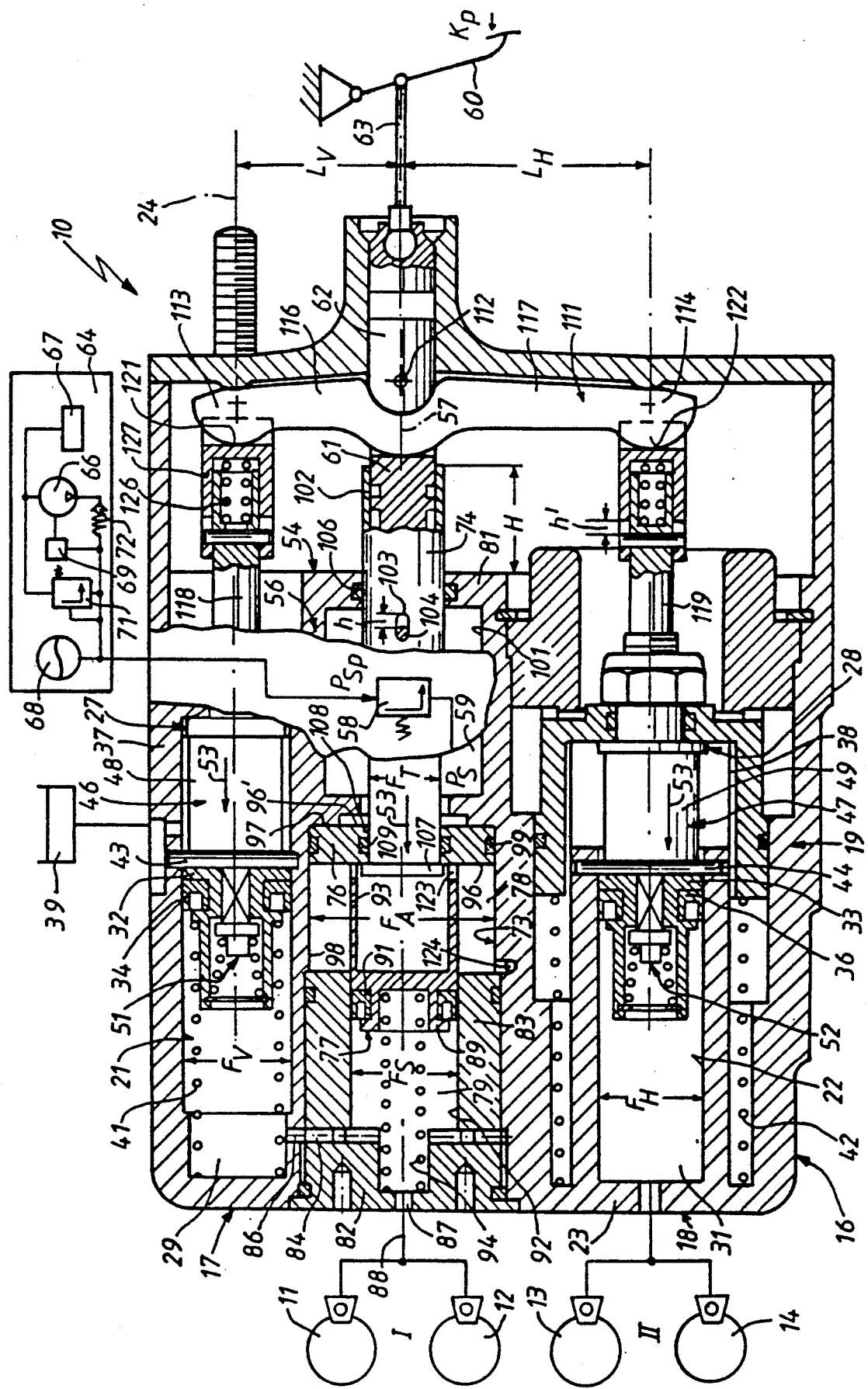

DUAL-CIRCUIT BRAKE BOOSTER

BACKGROUND OF THE INVENTION

1. Field of the Invention

The present invention relates to a brake apparatus for the pressure supply of the brakes of a hydraulic two-circuit brake installation of a road vehicle, in which at least one brake circuit is constructed as static brake circuit which is connected to an outlet pressure space, in which the brake pressure build up takes place by unidirectional displacement of the servo piston and of a master cylinder piston, whereby the servo piston experiences a pressure build-up displacement only when the brake servo unit operates properly and whereby the master cylinder piston experiences a pressure build-up displacement when the brake force servo unit is intact, as also when the brake force servo unit has failed, whereby in that case, in relation to a predetermined amount of the residual actuating force engaging at the master cylinder piston, an increase of the piston displacement travel and therewith a correlated pressure translation occurs.

2. Description of the Prior Art

Such a brake apparatus is known from the DE 34 44 828 A1.

In the known brake apparatus, a tandem master cylinder is coordinated to the static brake circuit of the primary outlet pressure space, along the central axis of which a linear hydrocylinder is arranged separated from the primary outlet pressure space by a partition wall, whose piston is provided on the side of the master cylinder with a plunger which passes through a central bore of the partition wall, sealed off with respect to the same, and is axially supported at the primary piston of the master cylinder.

The actuating cylinder piston has a piston rod on the side of the pedal which passes through an end wall of the cylinder housing also displaceably sealed pressure-tight with respect to the same. The pedal plunger is supported at this piston rod, by way of which the force exerted by the driver is introduced into the piston of the actuating cylinder. A brake valve is integrated into this piston which, depending on the actuating direction, couples a pressure proportional to the pedal force exerted by the driver, which pressure is derived from the high outlet pressure of an auxiliary pressure source, either into the actuating pressure space delimited axially in a fixed manner by the end wall of the cylinder housing and movably by the piston or—in case of a retraction movement of the brake pedal—into the space which is delimited axially movably by the piston of the actuating cylinder and fixedly by the partition wall which delimits the primary outlet pressure space of the master cylinder against this space of the actuating cylinder.

This actuating piston and together with the same the primary piston of the master cylinder is displaceable in the sense of a brake pressure build-up both when the brake servo unit is intact as also when the brake servo unit fails. The high pressure inlet chamber of the actuating cylinder is thereby constructed as annular space which is delimited in the axial direction by flanges of the actuating piston which are arranged at a distance from one another and which are sealed off with respect to the cylinder bore by O-rings.

A second housing bore is arranged adjacent the master cylinder and the actuating cylinder, having an arrangement parallel to the common longitudinal axis thereof, whereby a stepped piston is displaceably guided pressure-tight in the second housing bore, whose smaller piston step axially movably delimits an outlet pressure space in communicating connection with the primary outlet pressure space of the master cylinder, and whose larger piston step, together with a partition wall of the cylinder housing delimits a further actuating pressure space which is operatively connected by way of a function-control valve with the one actuating pressure space of the actuating cylinder which is fixedly delimited by the end wall of the cylinder housing on the pedal side. This second servo piston is displaceable in the sense of a brake pressure build-up within the outlet pressure space delimited by its smaller piston step and communicating with the primary outlet pressure space, only when the brake force servo unit is intact. This second booster or servo piston is provided with an L-shaped lug which axially engages also at the actuating piston containing the brake valve but is not securely connected with the same. As a result thereof, the actuating piston containing the brake valve is "taken along" by the second servo piston, so to speak of, when the brake force servo unit is operable; however, the second actuating piston remains stationary in its base position, into which it is urged by a return spring, when the brake force servo unit is not operable.

The considerable disadvantage of the known brake apparatus resides in that in case of a failure of the brake force booster or servo unit, disproportionately high pedal-actuating forces become necessary in order to cause the brake installation to respond, whereby the driver must actuate the brake pedal with about 50 to 60% of the maximum force to be applied by the driver until the brake pressure build-up starts. This is the consequence, on the one hand, of the fact that owing to the additional annular seals, by means of which the actuating piston of the actuating piston of the brake force servo unit containing the brake valve has to be displaceably sealed off with respect to the housing by means of altogether four additional annular seals, each of which contributes a friction to the friction resistance that is equivalent to several bar, and that—by reason of these friction losses—also relatively strong return springs are required urging the master cylinder pistons into the base positions thereof, which also provide a contribution to the forces equivalent to a pressure of several bar, against which the pistons have to be moved and which in case of a failure of the brake force booster or servo unit act in the sense of the pedal "becoming harder", i.e., a brake pressure can then be built up with an inoperative brake force servo unit only when the driver applies an actuating force corresponding to a minimum brake pressure of about 20 to 30 bar. As the actuating force necessary therefor is quite considerable, the driver, if he has to brake with an inoperative brake force servo unit, may receive the impression that the entire brake installation is inoperative which the driver will sense at least as a threatening situation. However, it may also lead in non-too-rare cases to a panic-like reaction which may become dangerous in a situation which requires a braking.

SUMMARY OF THE INVENTION

It is therefore the object of the present invention to improve a brake apparatus of the aforementioned type to the effect that the function elements provided for the realization of the brake force booster or servo unit contribute only to a markedly reduced extent to the friction losses which, in case of a failure of the brake force servo unit, have to be overcome alone by the pedal force still available.

The underlying problems are solved according to the present invention in that the servo piston displaceable only with an intact brake force servo unit includes an annular piston which is urged by pressure actuation of its actuating area by means of the outlet pressure of the brake force servo unit into unilateral abutment with an entrainment flange of a plunger piston extending through the annular piston in the axial direction and displaceable in the central opening thereof in a pressure-tight manner, which plunger piston, in its turn, is coupled for movement with a force transmission element, by way of which also the component of the actuating force resulting from the pedal actuation and acting on the master cylinder piston in the sense of a brake pressure build-up displacement, is introduced into the same.

According to the present invention, the introduction of the forces from the servo cylinder whose actuating piston is an annular piston, takes place by way of an entrainment flange of a plunger piston which, when the brake force servo unit does not operate, for example, by reason of a failure of its auxiliary pressure source, is only "pushed through" through the annular ring-shaped actuating piston, whereby the actuating piston remains in its base position and also the piston forming a part of the movable boundary of the outlet pressure space of the brake apparatus which is supported at the actuating piston, remains in its base position.

Friction losses caused by the brake force servo unit which have to be overcome in case of failure of the brake force servo unit by the actuating force to be applied by the driver, are thus limited to the friction losses caused by two annular seals, by means of which the plunger piston is displaceably sealed off, on the one hand, with respect to a partition wall of the housing of the brake apparatus on the pedal side and, on the other, with respect to the central bore of the annularly shaped actuating piston. Compared with the known brake apparatus, the friction losses conditioned by the brake force servo unit elements are reduced by 50% which leads to a clearly noticeable reduction of the actuating forces to be applied in case of a failure of the brake force servo unit for an actuation of the brake installation and thus also signifies a corresponding gain in safety for such an emergency case.

A constructively simple assembly of the actuating piston, favorable for a time-saving assembly as also for a small space requirement of the brake apparatus, and of a piston part movably delimiting the outlet pressure space of the static brake circuit of the brake apparatus is obtained according to the present invention in that the piston element displaceable only in case of an intact brake force servo unit which forms a movable boundary of the outlet pressure space, is constructed pot-shaped with an outer pot surface pointing toward the entrainment flange of the plunger piston, in that the inner diameter of the outer pot surface is larger than the diameter of the entrainment flange of the plunger piston and in that the axial length of the outer pot surface is at least and approximately equal to the maximum value of the brake pressure build-up stroke of the servo piston, respectively, of the master cylinder piston increased by the axial thickness of the entrainment flange of the plunger piston.

According to another feature of the present invention in connection with a brake installation in which both brake circuits are constructed as static brake circuits, a moment-compensated rocker member is provided for the transmission of both the pedal force as also of the auxiliary force produced by the brake force servo unit; the rocker member is thereby pivotally supported at a pressure member, displaceable in the axial direction, about an axis perpendicular to the axial plane, and in that the plunger piston is coupled for movement with the pressure member by way of a control piston which is axially displaceable relative to the plunger piston within a range limited to a small fraction of the maximum pressure build-up stroke of the master cylinder piston, whereby this range of the possible relative movements is at least and approximately equal to the closing stroke of central valves, by way of which in the base position of the master cylinder pistons the outlet pressure spaces of the master cylinders are communicatingly connected with the follower spaces thereof, and in that the rocker arms are also supported at the master cylinder pistons thereof by way of one support spring each, whose spring travel is also at least and approximately equal to the closing stroke of the central valves. This brake apparatus according to the present invention which has the construction indicated above, can be realized with a particularly small space requirement, as viewed in the axial direction, and offers the advantage by means of the elastic support provided in connection therewith of a pivotal rocker member provided for the introduction of the auxiliary force into the master cylinder pistons that the servo effect of the brake force servo unit is available already when the master cylinder pistons must carry out against the action of the return springs engaging at the same, out of their base position, in which their outlet pressure spaces still communicate with the follower spaces, the closing stroke of central valves necessary for closing with respect to these follower spaces or the idling travel determined by the opening cross section of equalization bores, whereby the pressure build-up in the outlet pressure spaces of the master cylinders coordinated to the brake circuits starts only after carrying out these operations.

A particularly appropriate and functionally reliable arrangement of spring elements is provided, by way of which the rocker member is adapted to be supported at the master cylinder pistons, if the support springs are arranged in axial recesses of the master cylinder pistons provided at step-shaped extensions, which are closed off by pot-shaped sleeves displaceably guided at the free ends of these extensions, whereby the rocker arms are slidingly supported at the bottom parts thereof by means of convexly curved support projections and whereby the stroke of the possible deflections of the sleeves with respect to the plunger-shaped extensions is delimited by abutment action.

A special design of the brake apparatus according to the present invention enables a symmetrical construction of the brake apparatus with respect to its cross center plane containing the central longitudinal axis of the brake force servo unit, that entails constructive advantages; this special design involves the use of two master cylinder pistons and of a piston delimiting the additional outlet pressure space of the brake force servo unit which all have the same cross section.

According to still another feature of the present invention, the connection of the brake circuit which is adapted to be acted upon with the pressure of the outlet pressure spaces communicating with each other, to the brake apparatus is arranged centrally in the part of the outlet pressure space delimited by the servo piston and the connecting part is constructed as a closure member installed in a pressure-tight and fixed manner into the housing bore in which the actuating piston is displaceably guided in a pressure-tight manner. Such a construction in accordance with the present invention is favorable as regards manufacture of the brake apparatus housing as well as assembly thereof.

According to still a further feature of the present invention, the housing space extending between the closure member and the annular piston is connected with the outside (atmospheric) space. The utilization of the space extending between the actuating piston and the closure member which forms the fixed boundary of a part of the outlet pressure space of the brake apparatus, as pressureless equalization space which is in operative connection with the outside space of the brake apparatus, i.e., is in operative communication with the surrounding atmosphere, permits in a simple manner the desired media separation between the actuating circuit of the brake force servo unit in which a customary hydraulic oil is used as pressure medium, and the brake circuit which contains the customary brake fluid as pressure medium, which media separation is required for a reliable operation of the brake installation.

BRIEF DESCRIPTION OF THE DRAWINGS

These and other objects, features and advantages of the present invention will become more apparent from the following description when taken in connection with the accompanying drawing which shows, for purposes of illustration only, one embodiment in accordance with the present invention, and wherein:

The single FIGURE is a simplified hydraulic schematic diagram of a brake apparatus according to the present invention realized of twin-type construction in a hydraulic two-circuit brake installation with two static brake circuits, illustrating the brake apparatus in cross section along its plane containing the central longitudinal axes of its two master cylinders and the central longitudinal axis of the brake force servo unit.

DETAILED DESCRIPTION OF THE PREFERRED EMBODIMENT

Referring now to the single FIGURE of the drawing, the hydraulic two-circuit brake installation generally designated by reference numeral 10 for a road vehicle which at the same time is intended to be represented by the brake installation, includes front wheel brakes 11 and 12 which are combined into a front wheel brake circuit I and the rear wheel brakes 13 and 14 which are combined into a rear axle brake circuit II.

The two brake circuits I and II are constructed in the specific embodiment as closed brake circuits whereby a brake apparatus generally designated by reference numeral 16 is provided for the pressure supply thereof which includes a master cylinder 17 coordinated to the front axle brake circuit I and a master cylinder 18 coordinated to the rear axle brake circuit II which in twin-type construction are arranged adjacent one another in a common housing 19 of the brake apparatus 16.

One cylinder bore 21, respectively, 22 is coordinated to each of the two master cylinders 17 and 18 inside of the housing 19 of the brake apparatus 16 which are closed off by an end wall 23 of the brake apparatus housing 19.

The central longitudinal axes 24 and 26 of the two master cylinder bores 21 and 22 extend parallel to one another in the illustrated arrangement. One master cylinder piston each, generally designated by reference numeral 27, respectively, 28, is displaceably guided in the master cylinder bores 21 and 22 which forms inside of the respective bore 21, respectively, 22, the axially movable boundary of an outlet pressure space 29 of the master cylinder 17 coordinated to the front axle brake circuit I, respectively, the axially movable boundary of the outlet pressure space 31 of the master cylinder 18 coordinated to the rear axle brake circuit II.

The two master cylinder pistons 27 and 28 each include a piston flange 32, respectively, 33 which is sealed off with respect to the respective cylinder bore 21, respectively, 22 by means of an annular seal 34, respectively, 36, fixedly arranged at the piston which, as a rule, is constructed as sealing sleeve; the piston flange 32, respectively, 33 delimits the respective master cylinder outlet pressure space 29, respectively, 31, in which brake pressure is adapted to be built up by a piston displacement, with respect to a follow-up space 37, respectively, 38, which is kept in constant communicating connection with the brake fluid reservoir tank 39 of the brake installation.

One return spring 41, respectively, 42, axially fixedly supported at the housing engages at the master cylinder piston 27 and 28 whereby the springs 41 and 42 urge the pistons 27 and 28 into the base positions thereof corresponding to the non-actuated condition of the brake installation 10 and linked, respectively, with the the maximum volume of the outlet pressure spaces 29, respectively, 31. These base positions are indicated in the particular illustrated embodiment by abutment action between the master cylinder piston 27, respectively, 28 and one small tubular abutment member or pin 43, respectively, 44 fixed at the housing, which extending perpendicularly to the respective longitudinal axis 24, respectively, 26 of the master cylinder 17, respectively, 18, pass through longitudinal slots 46, respectively, 47 of rod-shaped intermediate members 48, respectively, 49, of the pistons 27, respectively, 28 of the master cylinders 17, respectively, 18, whereby also the maximum pressure build-up stroke of the master cylinder pistons 27 and 28 is determined by the axial dimension of these longitudinal slots 46 and 47.

The master cylinder pistons 27 and 28 are each provided in the illustrated specific embodiment with a central valve 51, respectively, 52 of known construction which in the illustrated base positions of the master cylinders 27 and 28 assume their open positions in which the outlet pressure space 29 of the master cylinder 17 provided for the front axle brake circuit I is communicatingly connected with the follower space 37 thereof and the outlet pressure space 31 of the master cylinder 18 coordinated to the rear axle brake circuit II with the follower space 38 thereof.

These central valves 51 and 52 are constructed as seat valves which after a small starting section of the pressure build-up strokes of the master cylinder pistons 27 and 28 that take place in the direction of the arrow 53, pass over into their closing positions, in which the outlet pressure spaces 29 and 31 of the master cylinders 17 and 18 are closed off with respect to the follower spaces 37 and 38, whereby with a further displacement of the master cylinder pistons 27 and 28 in the direction of the arrow 53, the pressure build-up proportional to the respective piston travel, respectively, to the actuating force starts in the outlet pressure spaces 29 and 31 of the master cylinders 17 and 18.

For producing the actuating forces necessary for an adequate pressure build-up in the two brake circuits I and II and acting on the pistons 27 and 28 of the master cylinders 17 and 18, a hydraulic brake force booster or servo unit generally designated by reference numeral 54 is provided which is integrated into the brake apparatus 16.

This brake force servo unit 54 includes as actuating element a—linear—hydrocylinder 56 which is arranged "between" the two master cylinders 17 and 18 with an arrangement of its central longitudinal axis 57 parallel to the central longitudinal axes 24 and 26 of the two master cylinders 17 and 18.

A brake valve 58 only schematically indicated in the drawing and of any known construction is provided as control element of this brake force servo unit 54, respectively, of its actuating-hydrocylinder 56, by way of which, when the driver actuates the brake pedal 60 with a pedal force $K_p$ linked to a predetermined expected value of the brake force to be achieved, couples a control pressure $P_s$ proportional to this pedal force $K_p$ into an actuating pressure space 59 of the brake force servo unit 54.

A construction known as such is assumed for this brake valve 58, for example, as slide valve whose outlet pressure is proportional to the deflection of a control piston 61 out of the illustrated base position corresponding to the non-actuated condition of the brake installation 10, whereby this control piston 61 is securely connected with the pressure member 62 displaceably guided to and fro in the housing in the direction of the central longitudinal axis 57, and whereby the brake pedal 60 engages at the pressure member 62—by way of a pedal plunger 63. The brake valve 58 may be, for example, of the type of construction known from the DE-OS 31 36 975.

It therefore suffices to explain the brake valve 58 by reference to its functional properties. The control pressure $P_s$ is derived from the outlet pressure $P_{Sp}$ of an auxiliary pressure source generally designated by reference numeral 64 which of conventional construction includes a pressure reservoir adapted to be charged from a pressure medium tank 67 by means of a charging pump 66, whose outlet pressure is monitored by means of a pressure switch 69 that controls the activating phases of the charging pump 66 and which is kept at a charging condition varying between an upper limit value and a lower limit value by means of a pressure limit valve 71 and a reservoir-charging valve 72.

The brake force booster or servo unit 54 includes a piston arrangement 74, 76, 77 displaceable in the axial direction within a central housing bore generally designated by reference numeral 73; the piston arrangement includes an elongated rod-shaped plunger piston 74, an annular piston 76 coaxially surrounding the same over a section of its length and a pot-shaped piston 77 supported at the same in the axial direction, which form the axially movable, pressure-tight boundaries of the actuating pressure space 59 with respect to a pressureless equalization and media separating space 78, on the one hand, as well as the pressure-tight boundary thereof with respect to an outlet pressure space 79, on the other, which, as viewed in the direction of arrow 53, are arranged between a radially inwardly directed sealing flange 81 of the brake apparatus housing 19, closing off the central housing bore 73 on the pedal side, so as to speak of, and the bottom 82 of a thick-walled, pot-shaped closure member 83, which is inserted pressure-tight and fixed in the housing, into the end section of the central housing bore 73 remote from the pedal. The outlet pressure space 79 axially movably delimited by the pot-shaped piston element 77 is in communicating connection with the outlet pressure space 29 movably delimited by the master cylinder piston 27 of the master cylinder 17 coordinated to the front axle brake circuit I, by way of a cross bore 84 of the closure member 83 located near the bottom and by way of a cross bore 86 of the housing part containing the master cylinder bores 21 and 22 and aligned with the cross bore 84; the outlet pressure space 79 forms together with the outlet pressure space 29 the outlet pressure space chamber 29, 79 of the brake apparatus 16 coordinated to the front axle brake circuit I, whose connection 87 with the master brake line 88 of the front axle brake circuit I is arranged in the illustrated specific embodiment centrally in the bottom 82 of the closure member 83. The pot-shaped piston element 77, whose bottom flange 89 is displaceably sealed off in a pressure-tight manner with respect to the axial dead-end bore 92 of the pot-shaped closure member 83 by means of a sealing sleeve 91, is so arranged that its outer surface 93 points toward the annular piston 76.

The pot-shaped piston element 77 is urged into the—illustrated—base position corresponding to the non-actuated condition of the brake installation 10 by a prestressed return spring 94 which is supported axially at the bottom of the closure member 83, respectively, at the bottom flange 89 of the pot-shaped piston element 77, in the central recesses thereof; in this base position the annular piston 76 is retained in abutment with a radially inwardly pointing abutment shoulder 97 by support of the outer piston surface 93 at the end surface 96 of the annular piston 76 facing the same; the center section 98 of the central housing bore 73, with respect to which the annular piston 76 is displaceably sealed off pressure-tight by means of a radial outer annular seal 99 fixed with the piston, is offset by the abutment shoulder 97 with respect to the section 101 of the central housing bore 73 forming as to the rest the housing-fixed radial boundary of the actuating pressure space 59; the section 101 is closed off on the pedal side by the inwardly pointing radial sealing flange 81, through which the rod-shaped plunger piston 74 passes displaceable in a pressure-tight manner.

The end section 102 of the plunger piston 74 extending through the sealing flange 81 on the pedal side, whose free length is at least and approximately equal to the maximum pressure build-up stroke H of the master cylinder pistons 27 and 28 as well as of the pot-shaped piston element 77 and of the annular piston 76, is constructed tubularly shaped over a section of its length extending into the actuating pressure space 59, whereby the control piston 61 securely connected with the pressure member 62 is displaceably guided pressure-tight inside of this tubular section 102, in such a manner that axial relative movements between the control piston 61 and the plunger piston 74 are possible within a small fraction h, limited by abutment action, of the maximum pressure build-up stroke H of the piston arrangement 74, 76, 77 of the brake force servo unit 54 and of the master cylinder pistons 27 and 28. In the illustrated specific embodiment, this abutment limitation is attained by a radial abutment pin securely connected with the tubularly shaped end section 102 of the plunger piston 74, in conjunction with the cross edges of an elongated aperture 104 of the control piston 61 arranged at an axial distance from one another, whereby these abutment elements 103 and 104 are arranged inside of the actuating pressure space 59 sealed off with respect to the outside by the annular seal 1066, by means of which the plunger piston 74 is displaceably sealed off pressure-tight with respect to the sealing flange 81.

In the illustrated base position of the piston arrangement 74, 76, 77 of the brake force servo unit 54 corresponding to the non-actuated condition of the brake installation 10, the plunger piston 74 thereof is supported by means of a radial entrainment flange 107 at the inner edge of the end surface 96 of the annular piston 76 facing the separating space 78, whereby the plunger piston 74 displaceably passes pressure-tight through the central opening 108 thereof, and whereby an annular seal 109 providing the seal in connection therewith is arranged fixedly at the annular piston 76.

The plunger piston 74 is urged into this base position by the action of the return springs 41 and 42 which retain the master cylinder pistons 27 and 28 in the base positions thereof in the non-actuated condition of the brake installation 10, so that a rocker member 111 provided for the introduction of the actuating force into the master cylinder pistons 27 and 28 during a braking operation, is also retained in its illustrated base position in which the plunger piston 74 is "pulled" by the abutment action of the abutment elements 103 and 104 into abutment of its entrainment flange 107 with the annular piston 76. The rocker member 111 is thereby pivotally supported at the pressure member 62 displaceably connected with the control piston 61 about an axis 112 which extends perpendicular to the plane defined by the central axes 24 and 26 of the master cylinders 17 and 18 and is located in the cross center plane of the brake apparatus 16 containing the central longitudinal axis 57 of the brake force servo unit 54 and extending perpendicularly to this axial plane.

This rocker member 111 is axially supported at the plunger-shaped extensions 118, respectively, 119 of the master cylinder pistons 27, respectively, 28 by means of the free ends of its rocker arms 116, respectively, 117 formed by convexly arcuately-shaped support projections 113 and 114, whereby the contours of these support projections 113 and 114 are appropriately constructed in such a manner, i.e., have radii of curvature increasing toward the outside, that the support places 121 and 122 of the support projections 113, respectively, 114 at the end face surfaces of the plunger-shaped extensions 118 and 119 of the master cylinder pistons 27, respectively, 28, which extend at a right angle to the central axes 24 and 26 of the master cylinders 17 and 18, "always remain" on the central axes 24, respectively, 26 thereof.

The rocker member 111 is moment-compensated, which means that the ratio $L_V/L_H$ of the effective rocker arm lengths $L_V$ and $L_H$ which correspond in each case to the distances of the support places 121 and 122 measured at right angle to the central axes 244 and 26, respectively, 57 from the pivot axis 112 of the rocker, satisfy the equation $$L_V/L_H = F_H/F_V \qquad (1)$$

whereby $F_H$ is the cross-sectional area of the master cylinder bore 22 of the master cylinder 18 coordinated to the rear axle brake circuit II and $F_V$ the cross-sectional area of the master cylinder bore 21 of the master cylinder 17 coordinated to the front axle brake circuit I. It is achieved by this design of the rocker 111 that the master cylinder pistons 27 and 28 of the brake apparatus 16 carry out identical strokes during an actuation of the brake apparatus—assuming identical venting condition of the brake circuit I and II.

The diameter of the entrainment flange 107 of the plunger piston 74 is slightly smaller than the inner diameter of the outer pot surfaces 93 of the pot-shaped piston element 77. The latter is provided with edge apertures 123 at the edge of its outer pot surfaces 93 facing the annular piston, by way of which the interior space of the pot-shaped piston element 77 communicates with the annular space-shaped area of the equalization space 78 surrounding the same, which is in communication with the atmosphere by way of a vent channel 124, only schematically indicated and as to the rest enables the media separation between the servo circuit operated with the pressure medium of the auxiliary pressure source 64 from the front axle brake circuit I operated with the customary brake fluid.

The brake apparatus 16 described hereinabove with respect to its construction operates as follows:

As soon as the control piston 61 during an actuation of the brake apparatus 16 experiences a displacement in the direction of the arrow 53, be it initially only relative to the plunger piston 74, be it with increasing actuating force together with the same, then a control pressure $P_S$ proportional to the actuating force, respectively, to the absolute value of the displacement of the control piston 61 out of its base position, is coupled into the actuating pressure space 59, which control pressure acts on the annular surface 96' of the annular piston 76 movably delimiting the actuating pressure space 59, whose magnitude $F_R$ is given by the equation $$F_R = F_a - F_T \qquad (2)$$

whereby $F_A$ designates the cross-sectional area of the bore step 73, in which the annular piston 76 is displaceably guided pressure-tight and $F_T$ the cross-sectional area of the plunger piston 74 which the plunger piston 74 has inside of the central opening 108 of the annular piston 76. The force $K_R$ resulting therefrom and acting in the direction of the arrow 53, which provides the desired brake force servo action, is then given by the equation $$K_R = F_R \cdot P_s \qquad (3)$$

This force $K_R$ acts also on the rocker member 111 by the support of the annular piston 76 at the entrainment flange 107 of the plunger piston and by way of the rocker member also on the master cylinder pistons 27 and 28 as well as on the pot-shaped piston 77 by the axial support of the annular piston 76 at the pot-shaped piston 77.

If the effective cross-sectional area of this pot-shaped piston 77 is designated by $F_S$, then the relation results for the brake pressures $P_B$ effective in the front axle brake circuit I and in the rear axle brake circuit II which by reason of the moment-compensated construction of the rocker member 111 have the same value, as follows $$P_B = (K_R \cdot u \cdot K_P)/(F_V + F_H + F_S) \qquad (4)$$

whereby ü designates the pedal transmission ratio, with which the actuating force acting on the pressure member 62 is translated with respect to the force $K_p$ with which the driver steps on the brake pedal 60.

As the maximum control pressure $P_S$ which can be utilized in the actuating pressure space 59 of the brake force servo unit 54, is limited to the maximum value of the outlet pressure $P_{Sp}$ of the auxiliary pressure source 64, also with strongest actuation of the brake apparatus an increase of the brake pressure can take place at most up to a value $P_{Bmax}$, which is given by the equation $$P_{Bmax} = F_R \cdot P_{smax}/F_S \qquad (5)$$

whereby $P_{smax}$ designates the maximum value of the outlet pressure of the auxiliary pressure source 64.

Beginning with this brake pressure $P_{Bmax}$ the force resulting fro the pressure actuation of the pot-shaped piston element 77 on its surface delimiting the outlet pressure space 79, which acts in the direction opposite to the arrow 53, is greater than the force acting on the piston element 77 in the direction of the arrow 53, whose maximum value is given by the value $F_R \cdot P_{smax}$.

A super-elevated increase of the actuating force then only has as a consequence that the piston element 77 moves back in the direction toward its base position, as a result of which a brake pressure increase beyond an acceptable maximum value, which can be constructively predetermined by the design of the brake apparatus 16, is prevented.

In the illustrated specific embodiment, the rocker arms 116 and 117 are axially supported at the plunger-shaped extensions 118 and 119 of the master cylinder pistons 27 and 28 by way of one return spring 126 each whose prestress is considerably smaller than that of the return springs 41 and 42 which urge the master cylinder pistons 27 and 28 into the base positions thereof. These return springs 126 are arranged in axial recesses of the plunger-shaped extensions 118 and 119, which are closed off by pot-shaped sleeves 127 whose bottom is arranged pointing toward the respective support projection 113, respectively, 114 of the respective rocker arm 116, respectively, 117, whereby the stroke h' of the possible relative movements of these sleeves 127 with respect to the plunger-shaped extensions 118 and 119 are again limited by abutment action to a value which is matched as regards magnitude to the possible stroke h of the relative movements of the control piston 61 with respect to the plunger piston 74 and preferably corresponds to this stroke h.

It is achieved thereby in the final analysis that the servo action is available already for the closing stroke of the central valves 51 and 52, for the realization of which the master cylinder pistons 27 and 28 must be displaced against the return force of the—strong—return springs 41 and 42. A particularly good and comfortable response behavior of the brake installation 10 is achieved thereby, at least as long as the brake force servo unit 54 operates properly.

In case of a failure of the brake force servo unit 54, the brake pressure $P_B$ which is still attainable by means of a predetermined pedal force $K_p$ is given by the equation $$P_B = K_p \cdot u/(F_V + F_H) \qquad (6)$$

i.e., in relation to the equation (4) a pressure value is attained, in relation to a predetermined value of the actuating force, at the ratio $(F_V + F_H + F_S)/(F_V + F_H)$, however with corresponding longer pedal travel.

While I have shown and described only one embodiment in accordance with the present invention, it is understood that the same is not limited thereto but is susceptible of numerous changes and modifications as known to those skilled in the art, and I therefore do not wish to be limited to the details shown and described herein but intend to cover all such changes and modifications as are encompassed by the scope of the appended claims.

I claim:

1. A brake apparatus for the pressure supply of brakes of a hydraulic two-circuit brake installation of a road vehicle, comprising two static brake circuits, outlet pressure spaces, the static brake circuits being operatively connected with respective ones of the outlet pressure spaces, brake force servo means including servo-piston means, two master cylinder pistons associated with respective ones of the two circuits, a brake pressure build-up taking place in said outlet pressure spaces as a result of displacement in the same direction of the servo-piston means and of the master cylinder pistons, the servo-piston means experiencing a pressure build-up displacement only when the brake force servo means operates properly, and the master cylinder pistons experiencing a pressure build-up displacement when the brake force servo means is operable and inoperable in which case an increase of the piston displacement travel and a pressure value correlated therewith occurs in relation to a predetermined magnitude of an actuating acting force engaging at the master cylinder pistons, the servo-piston means including an annular piston with a central opening, a plunger piston extending through the annular piston in the axial direction and being displaceable pressure-tight in the central opening, the plunger piston including an entrainment flange, the annular piston being urged into unilateral abutment with the entrainment flange of the plunger piston by pressure actuation of an actuation surface of the annular piston with an outlet pressure of the brake force servo means, the plunger piston being coupled for movement with a force transmitting means for introducing a component of the actuating force resulting from pedal actuation in the sense of a pressure build-up displacement to act on the master cylinder pistons, the master cylinder pistons being of twin-type construction and arranged in a common housing with their central longitudinal axis extending substantially parallel to one another, the brake force servo means being arranged between the two master cylinder pistons with its central axis extending parallel to the master cylinder piston axes, the force transmission means including a moment-compensated rocker means for the transmission both of the pedal force and of an auxiliary force produced by the brake force servo means, the rocker means being pivotally supported at a pressure member displaceable in the axial direction about an axis perpendicular to the axial plane, and the plunger piston being operatively coupled for movement with the pressure member by a control piston which is axially displaceable relative to the plunger piston within a range limited to a small fraction of the maximum pressure build-up stroke of the master cylinder pistons, said range being at least approximately equal to a closing stroke of central valves operatively arranged in a base position of respective ones of the two master cylinder pistons such that the outlet pressure spaces associated with the respective ones of the master cylinder pistons are communicatingly connected with follower spaces thereof, and the rocker means including rocker arms which are supported by a respective support spring operatively connected with respective ones of the two master cylinder pistons, wherein the support springs have a spring travel also approximately about equal to the closing stroke of the central valves.

2. A brake apparatus according to claim 1, wherein the support springs ar arranged in axial recesses of step-shaped extensions of the master cylinder pistons, said recesses being closed off by pot-shaped sleeves displaceably guided at the free ends of the extensions, the rocker arms being slidingly supported at the bottom parts of the sleeves by means of convexly curved support projections, and the stroke of the sleeves with respect to the extensions being limited by an abutment.

3. A brake apparatus according to claim 2, wherein the servo-piston means of the brake force servo means delimit an additional outlet pressure space and have substantially the same cross section a the two master cylinder pistons.

4. A brake apparatus according to claim 3, wherein the brake circuits communicate with the respective outlet pressure spaces so as to be acted upon by the pressure of the outlet pressure spaces, and the brake apparatus is connected centrally at a portion of the outlet pressure spaces delimited by the servo piston means.

5. A brake apparatus according to claim 4, wherein the communication between the brake circuits and outlet pressure spaces is provided by a closure member inserted pressure-tight and fixedly into a housing bore in which an actuating piston means of the servo-piston means is displaceably guided pressure-tight.

6. A brake apparatus according to claim 5, in which a space extending between the closure member and the annular piston is in communication with an outside space.

7. A brake apparatus according to claim 1, wherein the servo-piston means is displaceable only with an intact brake force servo means and forms a movable boundary of the outlet pressure space and is constructed pot-shaped with an outer pot surface pointing toward the entrainment flange of the plunger piston, the inner diameter of the outer pot surface being larger than the diameter of the entrainment flange of the plunger piston, and the axial length of the outer pot surface being at least and approximately equal to the maximum value of the brake force build-up stroke of the servo piston means and of the master cylinder pistons in addition to the axial thickness of the entrainment flange of the plunger piston.

8. A brake apparatus according to claim 7, wherein the support springs are arranged in axial recesses of the step-shaped extensions of the master cylinder pistons, said recesses being closed off by pot-shaped sleeves displaceably guided at the free ends of the extensions, the rocker arms being slidingly supported at the bottom parts of the sleeves by means of convexly curved support projections, an the stroke of the sleeves with respect to the extensions being limited by an abutment.

9. A brake apparatus according to claim 7, wherein the servo-piston mans of the brake force servo means delimit an additional outlet pressure space means and have substantially the same cross section as the two master cylinder pistons.

10. A brake apparatus according to claim 7, wherein the brake circuits communicate with the respective outlet pressure spaces so as to be acted upon by the pressure of the outlet pressure spaces, and the brake apparatus is connected centrally at a portion of the outlet pressure spaces delimited by the servo piston means.

11. A brake apparatus according to claim 10, wherein the communication between the brake circuits and outlet pressure spaces is provided by a closure member inserted pressure-tight and fixedly into a housing bore in which an actuating piston means of the servo-piston means is displaceably guided pressure-tight.

12. A brake apparatus according to claim 11, in which a space extending between the closure member and the annular piston is in communication with an outside space.

* * * * *